US006944671B2

(12) United States Patent
Cheng

(10) Patent No.: US 6,944,671 B2
(45) Date of Patent: Sep. 13, 2005

(54) METHOD OF RAPIDLY DETERMINING THE TRANSMISSION TIME AND RANGE OF A POSITION MESSAGE UNDER INTERNET VIRTUAL REALITY ENVIRONMENT

(75) Inventor: Yu-Jung Cheng, Taipei (TW)

(73) Assignee: Institute For Information Industry, Taipei (TW)

( * ) Notice: Subject to any disclaimer, the term of this patent is extended or adjusted under 35 U.S.C. 154(b) by 778 days.

(21) Appl. No.: 09/729,105

(22) Filed: Dec. 5, 2000

(65) Prior Publication Data

US 2002/0069290 A1 Jun. 6, 2002

(51) Int. Cl.[7] ........................ G06F 15/16; G06F 15/173
(52) U.S. Cl. ........................................ 709/232; 709/224
(58) Field of Search ................................ 709/201, 223, 709/229–231, 224, 234–235, 238–239, 242; 718/104–106; 712/10–15

(56) References Cited

U.S. PATENT DOCUMENTS

| | | | | |
|---|---|---|---|---|
| 5,630,129 A | * | 5/1997 | Wheat | 718/105 |
| 6,240,068 B1 | * | 5/2001 | Dawes | 370/252 |
| 6,370,163 B1 | * | 4/2002 | Shaffer et al. | 370/519 |
| 2002/0143960 A1 | * | 10/2002 | Goren et al. | 709/229 |

OTHER PUBLICATIONS

Culler et al.; Parallel Computer Architecture: A Hardware/Software Approach; 1999; Morgan Kaufmann Publishers; pp. 131–135.*

Leiserson et al., The Network Architecture of the Connection Machine CM–5; Mar. 21, 1994; Thinking Machines Corporation.*

Cisco Systems, Inc.; Network Essentials for Small Businesses: A Step–by–Step Planning Guide; 1999; pp. 11 and 27–31.*

J. Mark Pullen; "Networking Technology and DIS"; Aug. 1995; Proceedings of the IEEE, vol. 83, No. 8.

Wentong Cai, Francis B.S. Lee, L. Chen; An Auto–adaptive Dead Reckoning Algorithm for Distributed Interactive Simulation; School of Applied Science.

* cited by examiner

*Primary Examiner*—Paul H. Kang
*Assistant Examiner*—Q Nguyen
(74) *Attorney, Agent, or Firm*—Bacon & Thomas, PLLC

(57) ABSTRACT

A method of rapidly determining the transmission time and range of a position message under an Internet virtual reality environment is employs a timer scheme for updating the virtual reality environment by using a timer to count a time value. A virtual scene is divided into plural blocks. A block where a user is in and blocks neighboring to the block are defined as a low interactive area of interest, which is divided into plural sub-blocks. A sub-block where the user is in and sub-blocks neighboring to the sub-block are defined as a high interactive area of interest. A message is transmitted to update the virtual reality environment based on different settings of the low interactive area of interest and the high interactive area of interest when the timer is up and the virtual reality environment reaches a predetermined inconsistency, wherein the time value for the high interactive area is shorter than that for the low interactive area.

4 Claims, 3 Drawing Sheets

METHOD OF RAPIDLY DETERMINING THE TRANSMISSION TIME AND RANGE OF A POSITION MESSAGE UNDER INTERNET VIRTUAL REALITY ENVIRONMENT

BACKGROUND OF THE INVENTION

1. Field of the Invention

The present invention relates to the technical field of a virtual reality three-dimensional multi-participant interactive system and, more specifically to a method of rapidly determining the transmission time and range of a position message under an Internet virtual reality environment.

2. Description of Related Art

In recent years, due to fast development of virtual reality and network technology, various 3D (three-dimensional) multi-user interactive systems have been disclosed for users from different countries around the world to talk to one another or to make other interactions in a virtual reality scene. Following the popularity of Internet, the application of 3D multi-user interactive systems has become more and more popular.

In a 3D multi-user interactive system, as shown in FIG. 3, the interactions among the users 31 in the virtual scene 32 are transmitted through a network 33. Therefore, interactive messages of the users in the virtual scene 32 must be quickly transmitted and processed. If the transmission of interactive messages cannot be quickly processed due to the delay of the network 33, the picture at the user end becomes unstable, resulting in low usability of the 3D multi-user interactive system.

When more users 31 are connected to the line at the same time in the same virtual world, the efficiency of the system becomes degraded because lots of messages must be processed. Furthermore, because the Internet is of a highly delayed and low bandwidth environment, there is a limit to real time requirement in a 3D multi-user system. In order to achieve acceptable real time interactive requirement, certain schemes, such as dead reckoning and timer, are used to reduce network bandwidth demand in a multi-user virtual environment.

The timer scheme is to use a timer to count a predetermined time value, so as to transmit a message 34 for informing all participated users 31 to update their states when the time is up and there is a significant difference in the state of the virtual environment. The dead reckoning scheme is to estimate the position of the participated users 31 that has not received the interactive message by an algorithm, and to transmit the position message 34 only when the difference between the estimated value and the value of the real position of the participated user 31 in the scene is larger than a threshold value, so as to reduce the number of network packets to be transmitted.

However, when more and more users are connected to the 3D multi-user interactive system at the same time, the quantity of network packets to be received and processed by the computer at the user end is greatly increased. As a result, the aforesaid schemes cannot satisfy the practical requirements. Therefore, it is desirable to provide an improved method to mitigate and/or obviate the aforementioned problems.

SUMMARY OF THE INVENTION

The object of the present invention is to provide a method of rapidly determining the transmission time and range of a position message under an Internet virtual reality environment, which is able to determine the transmission time and range of a position message subject to the relationship of the positions between the user and the participants so as to improve interaction and constancy capability, and to avoid the transmission of unnecessary messages.

To achieve the aforesaid object, the method comprises the steps of: (A) dividing a virtual scene into a plurality of blocks for determining an area of interest; (B) defining a block where an user is in and blocks neighboring to the block as a low interactive area of interest; (C) dividing each block of the low interactive area of interest into a plurality of sub-blocks; (D) defining a sub-block where the user is in and sub-blocks neighboring to the sub-block as a high interactive area of interest; and (E) transmitting a message to update state of virtual reality based on different settings of the low interactive area of interest and the high interactive area of interest when the virtual reality environment reaches a predetermined inconsistency.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
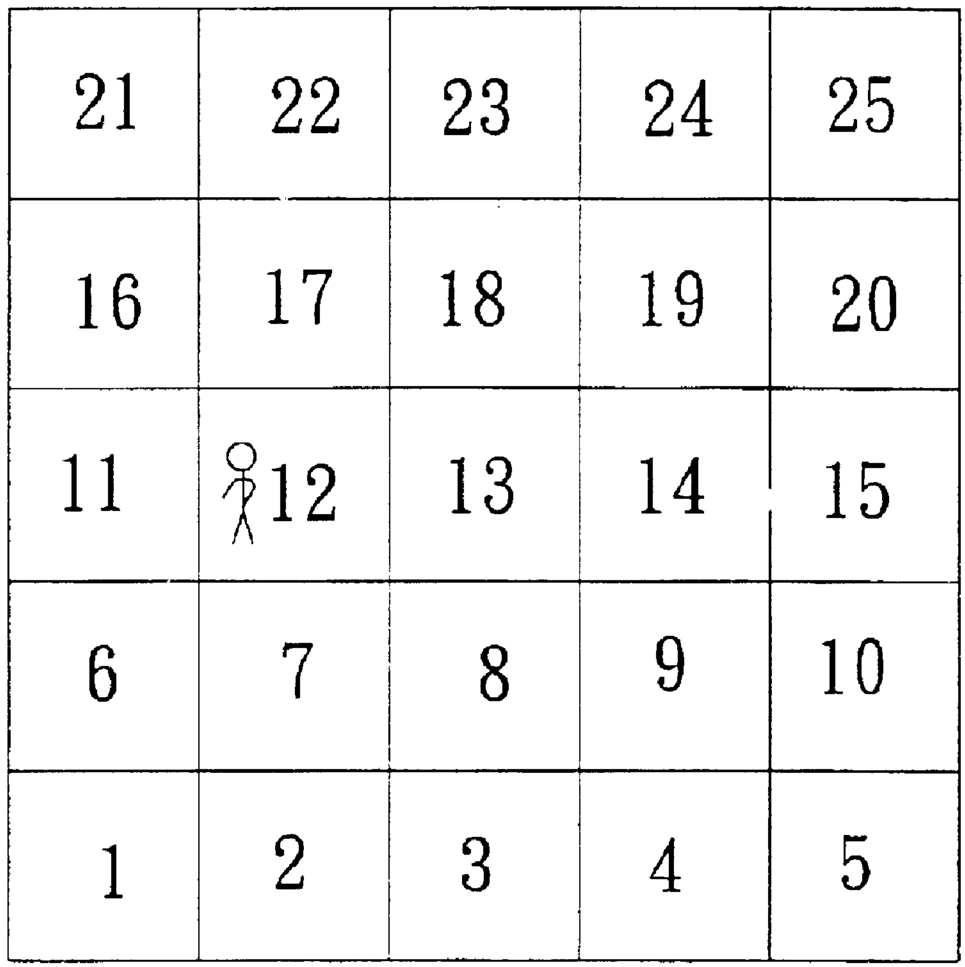
FIG. 1 illustrates a virtual scene after a first stage of division according to the present invention.

The method of rapidly determining the transmission time and range of a position message under an Internet virtual reality environment in accordance with the present invention is based on an AOI (Area Of interest) concept to determine the AOI area by dividing virtual scene in a square division or an interlaced square division manner. As illustrated in FIG. 1, a virtual scene 11 is divided into a plurality of blocks numbered from 1 through 25 by means of square division, in which the user is assumed to be at the block numbered 12, which is referred as an user block. The user block (numbered 12) and its neighboring blocks (numbered 6, 7, 8, 11, 13, 16, 17 and 18) are defined as the user's low interactive AOI area.

Figure 2:
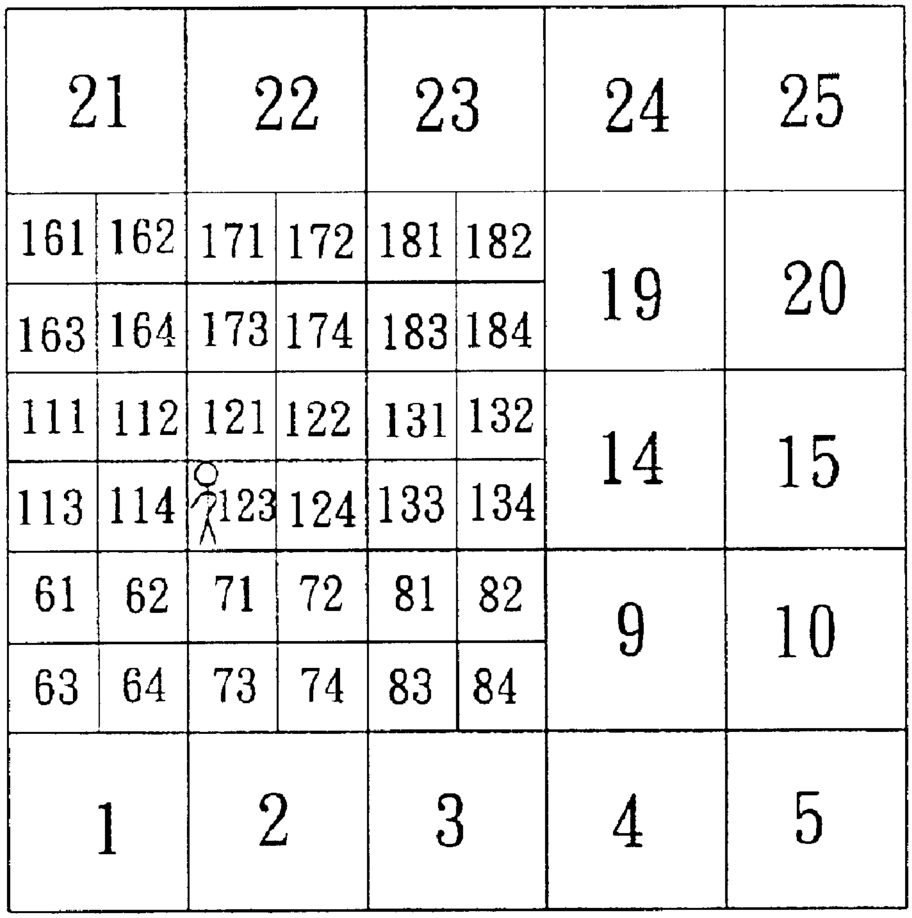
FIG. 2 illustrates the virtual scene after a second stage of division according to the present invention.
Figure 3:
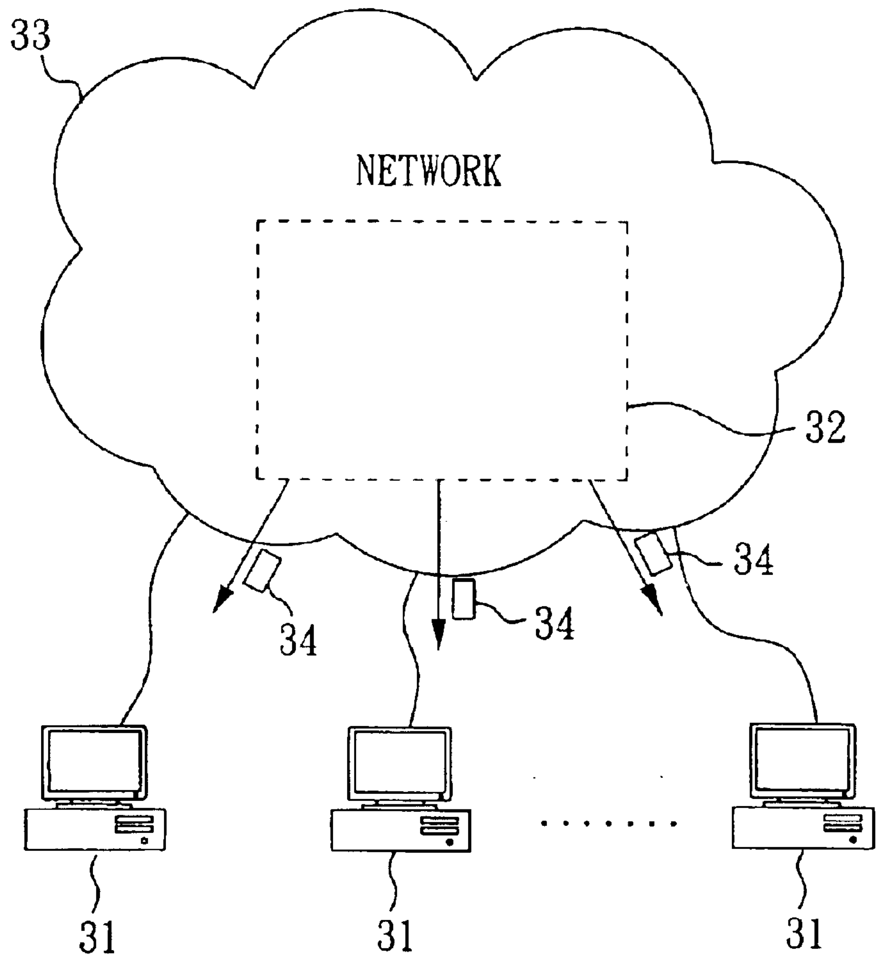
FIG. 3 schematically illustrates a 3D multi-user interactive system.

With reference to FIG. 2, the method of the present invention is to further divide each block in the aforesaid user's low interactive AOI area into four sub-blocks by means of square division. As illustrated, the user is at the sub-block numbered 123. Based on the same AOI concept, this user sub-block (numbered 123) and its neighboring sub-blocks (numbered 62, 71, 72, 114, 124, 112, 121 and 122) are defined as the user's high interactive AOI area.

Consequently, the interactive range is determined by the above two stages of divisions. When the inconsistency of the virtual environment reaches the value of interactive area, the timer scheme or dead reckoning algorithm is performed to transmit a message for updating state based on different settings of the low interactive AOI area and the high interactive AOI area. For example, when a timer is used to count a predetermined length of time and to update the state after the time is up, it sets a small time value (for example, 500 ms) for the high interactive AOI area, and a large time value (for example, 1000 ms) for the low interactive AOI area. If the dead reckoning algorithm is used to estimate the position of the participant in the scene for updating the state only when the difference between the value of the estimated position and the value of the real position is larger than a predetermined threshold value, it sets a small threshold value (for example, 2.5) for the high interactive AOI area, or a large critical value (for example 5) for the low interactive AOI area.

In view of the foregoing, the method of the present invention uses two stages of divisions to determine a high interactive AOI area and a low interactive AOI area, and further uses different time values or dead reckoning threshold values to determine the transmission time and range of the position message subject to different grades of interactive AOI areas. Therefore, the participants who actually interact with the user are allowed to occupy more bandwidth, while the participants who do not interact with the user will not occupy the bandwidth. Accordingly, the transmission of unnecessary messages is greatly reduced, thereby effectively improving the interaction and constancy capabilities of the virtual environment without increasing the burden of the whole system.

Although the present invention has been explained in relation to its preferred embodiment, it is to be understood that many other possible modifications and variations can be made without departing from the spirit and scope of the invention as hereinafter claimed.

What is claimed is:

1. A method of rapidly determining the transmission time and range of a position message under an Internet virtual reality environment, in which a timer scheme is employed for updating the virtual reality environment by using a timer to count a predetermined time value so as to transmit a message for informing all users participating in the virtual reality environment to update their positions when the time value has elapsed and the virtual reality environment reaches a predetermined inconsistency, the method comprising the steps of:

(A) dividing a virtual scene into a plurality of blocks for determining an area of interest;

(B) defining a block where a user is in and blocks neighboring to the block as a low interactive area of interest;

(C) dividing each block of the low interactive area of interest into a plurality of sub-blocks;

(D) defining a sub-block where the user is in and sub-blocks neighboring to the sub-block as a high interactive area of interest; and (E) transmitting a message to update the virtual reality environment based on the low interactive area of interest and the high interactive area interest when the predetermined time value for a respective one of the low and high interactive areas of interest has elapsed and the virtual reality environment reaches a predetermined inconsistency, wherein the predetermined time value for the high interactive area of interest is set shorter than that for the low interactive area of interest.

2. The method as claimed in claim 1, wherein, in steps (A) and (C), the virtual scene and block are divided in a square division manner.

3. A method of rapidly determining the transmission time and range of a position message under an Internet virtual reality environment, in which a dead reckoning scheme is employed for updating the virtual reality environment by estimating a position of a user participating in the virtual reality environment so as to transmit a message to update the position of the user when a difference between the estimated position and actual position of the user is larger than a predetermined threshold, the method comprising the steps of:

(A) dividing a virtual scene into a plurality of blocks for determining an area of interest;

(B) defining a block where the user is in and blocks neighboring to the block as a low interactive area of interest;

(C) dividing each block of the low interactive area of interest into a plurality of sub-blocks;

(D) defining a sub-block where the user is in and sub-blocks neighboring to the sub-block as a high interactive area of interest; and (E) transmitting a message to update the virtual reality environment based on the low interactive area of interest and the high interactive area of interest when the difference between the estimated position and actual position of the user is larger than the predetermined threshold value, wherein the predetermined threshold for the high interactive area is set smaller than that for the low interactive area of interest.

4. The method as claimed in claim 3, wherein, in steps (A) and (C), the virtual scene and block are divided in a square division manner.

* * * * *